US009796851B2

(12) United States Patent
Reilly

(10) Patent No.: US 9,796,851 B2
(45) Date of Patent: Oct. 24, 2017

(54) HYDRAULIC CRUMB SILICONE AND ORTHOTICS COMPRISING SAME

(71) Applicant: The Trustees of The University of Pennsylvania, Philadelphia, PA (US)

(72) Inventor: Patrick T. Reilly, Kennett Square, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 189 days.

(21) Appl. No.: 14/655,815

(22) PCT Filed: Jan. 9, 2014

(86) PCT No.: PCT/US2014/010766
§ 371 (c)(1),
(2) Date: Jun. 26, 2015

(87) PCT Pub. No.: WO2014/110193
PCT Pub. Date: Jul. 17, 2014

(65) Prior Publication Data
US 2015/0344693 A1   Dec. 3, 2015

Related U.S. Application Data

(60) Provisional application No. 61/750,890, filed on Jan. 10, 2013.

(51) Int. Cl.
| | |
|---|---|
| *C08L 75/04* | (2006.01) |
| *C08L 75/06* | (2006.01) |
| *C08L 83/04* | (2006.01) |
| *C08L 75/00* | (2006.01) |
| *A43B 5/00* | (2006.01) |
| *A43B 17/00* | (2006.01) |
| *A41D 13/05* | (2006.01) |
| *A41D 13/06* | (2006.01) |
| *A01L 5/00* | (2006.01) |
| *A01L 7/02* | (2006.01) |
| *C08G 77/12* | (2006.01) |
| *C08G 77/20* | (2006.01) |
| *C08G 77/00* | (2006.01) |

(52) U.S. Cl.
CPC ............ *C08L 83/04* (2013.01); *A01L 5/00* (2013.01); *A01L 7/02* (2013.01); *A41D 13/0543* (2013.01); *A41D 13/065* (2013.01); *A43B 5/00* (2013.01); *A43B 17/003* (2013.01); *C08L 75/00* (2013.01); *C08G 77/12* (2013.01); *C08G 77/20* (2013.01); *C08G 77/80* (2013.01); *C08G 2410/00* (2013.01); *C08L 2205/025* (2013.01); *C08L 2205/03* (2013.01)

(58) Field of Classification Search
CPC ...... C08L 83/04; C08K 5/5419; C08K 5/5425
USPC ................................................. 524/266–268
See application file for complete search history.

(56) References Cited

U.S. PATENT DOCUMENTS

| | | | | |
|---|---|---|---|---|
| 3,843,601 | A | * | 10/1974 | Bruner ..................... C10M 3/00 188/268 |
| 3,983,345 | A | * | 9/1976 | Phillips ................ H01H 33/668 218/122 |
| 4,376,438 | A | | 3/1983 | Straube et al. |
| 4,433,680 | A | | 2/1984 | Yoon |
| 4,444,269 | A | | 4/1984 | Laurent |
| 4,470,466 | A | | 9/1984 | Nakanishi |
| 4,502,479 | A | | 3/1985 | Garwood et al. |
| 4,686,271 | A | | 8/1987 | Beck et al. |
| 4,722,957 | A | * | 2/1988 | Braun .................. C08G 77/398 524/262 |
| 4,879,073 | A | * | 11/1989 | Kromrey ............. B29C 35/0888 264/137 |
| 4,973,642 | A | * | 11/1990 | Donatelli ................... C08J 3/12 264/331.11 |
| 4,981,010 | A | | 1/1991 | Orza et al. |
| 5,009,687 | A | | 4/1991 | Kromrey |
| 5,306,448 | A | | 4/1994 | Kromrey |
| 5,528,885 | A | | 6/1996 | Chamberlain |
| 5,706,898 | A | | 1/1998 | Beadle |
| 5,952,053 | A | | 9/1999 | Colby |
| 6,237,333 | B1 | * | 5/2001 | Lee ......................... B64C 25/22 60/487 |
| 6,362,287 | B1 | | 3/2002 | Chorvath et al. |
| 6,362,288 | B1 | | 3/2002 | Brewer et al. |
| 6,417,293 | B1 | | 7/2002 | Chorvath et al. |
| 6,465,552 | B1 | | 10/2002 | Chorvath et al. |
| 6,569,955 | B1 | | 5/2003 | Brewer et al. |
| 6,569,958 | B1 | | 5/2003 | Gross et al. |
| 6,759,487 | B2 | * | 7/2004 | Gornowicz .......... C08G 77/458 524/588 |
| 6,843,323 | B2 | | 1/2005 | Poynton |
| 7,793,734 | B2 | | 9/2010 | Burns |

(Continued)

OTHER PUBLICATIONS

Lee et al.; "High Strain Rate Deformation of Layered Nanocomposites"; Nature Communications; 2012; 9 pages.

*Primary Examiner* — Marc Zimmer
(74) *Attorney, Agent, or Firm* — Baker & Hostetler LLP

(57) ABSTRACT

The invention concerns cushioning compositions comprising (a) at least one of urethane polymer and silicone polymeric putty; and (b) hydraulic silicone crumb; said hydraulic silicone crumb being mixed with component (a). The invention also concerns devices and methods using such compositions. Protective devices have been used to protect the hoofs of animals. Shoes have been used to protect the hoofs from damage while the animal is walking or running.

21 Claims, 2 Drawing Sheets

(56) References Cited

U.S. PATENT DOCUMENTS 8,186,447 B2   5/2012   Osborne
8,220,231 B2   7/2012   Ruetenik

* cited by examiner

HYDRAULIC CRUMB SILICONE AND ORTHOTICS COMPRISING SAME

CROSS REFERENCE TO RELATED APPLICATIONS

This application claims priority to U.S. Patent Application Ser. No. 61/750,890 filed Jan. 10, 2013, and PCT Application Ser. No. PCT/US14/10766, filed Jan. 9, 2014, the contents of each are incorporated by reference in their entirety for all purposes.

TECHNICAL FIELD

The invention concerns use of hydraulic crumb silicone to provide an improved material for cushioning end uses.

BACKGROUND

Protective devices have been used to protect the hoofs of animals. Metal shoes have been used to protect the hoofs from damage while the animal is walking or running. Recently animal hoof shock absorbing pads and shoes have also been utilized. Some of these shock-absorbing shoes consist of pads attached to the hoof by means of a more or less conventional metal shoe. Others are attached by adhesives or held in place by specially designed boots. Examples of shoes and boots for horses can be found, for example, in U.S. Pat. Nos. 4,470,466, 4,444,269, 4,981,010, 5,528,885, 7,793,734, 8,186,447 and 8,220,231. Certain devices have been designed for the treatment of laminitis or to correct injured or anatomically incorrect hoofs. Many of the proposed pads have some means of support for the frog of the animal's hoof. See, for example, U.S. Pat. No. 5,706,898.

Force on the hoof changes depending on many factors, including stance or various gaits. A material which provides a variable response to various force levels would be advantageous. Soft materials provide sufficient support at lower forces, but harder materials are required to support the hoof at higher loads (often associated with walking or running horses). The harder materials might be too hard for long periods of support of lower level force, such as that observed in a standing animal. Commercial protective devices, however, often do not provide sufficient support at high pressures experienced by the hooves of horses under certain conditions.

Protective devices may also be utilized in other fields where protection from shock and impact are important. Such uses include industries ranging from human orthotics to car seats or mattresses. This would possibly have an advantage in any industry where comfort and support would appear to be a conflict of mechanical values.

There is a need in the art for devices with improved performance and protection.

SUMMARY

In some embodiments, the invention concerns cushioning compositions comprising (a) at least one of urethane polymer and silicone polymeric putty; and (b) hydraulic silicone crumb; said hydraulic silicone crumb being mixed with component (a). Some hydraulic silicone crumbs have a Shore 00 hardness of 50-55. In certain embodiments, the hydraulic silicone crumb has a compressive strength of 60-80 kPa when measured on a specimen that is 2.5 cm square and 1.27 cm thick. In some embodiments, the hydraulic silicone crumb has a compressive strength of about 70 kPa when measured on a specimen that is 2.5 cm square and 1.27 cm thick. In certain embodiments, the hydraulic silicone crumb, upon a compression deformation of about 40%, shears into smaller particles. In some embodiments, the hydraulic silicone crumb expresses a non-linear deformation response to pressure at pressures exceeding 1000 N.

Any suitable silicone polymeric putty may be used in connection with the invention. In some embodiments, the silicone polymeric putty comprises one or more of vinyl terminated polydimethylsiloxane, hydroxy terminated polydimethyl siloxane, and polydimethyl siloxane. Likewise, any suitable polyurethane polymer may be utilized in the invention. In certain embodiments, the polyurethane polymer is derived from reactants comprising aromatic diisocyanate and at least one of polyether polyol and polyester polyol.

In other embodiments, the invention concerns devices comprising a cushioning composition described herein. In some embodiments, the device is adapted for use as a component of an orthotic sole pad, shoe or boot for a horse. In other embodiments, the device is adapted for use as a component of a human shoe. One preferred human shoe is an athletic shoe. One preferred embodiment of a shoe component is an insert for a shoe. Another preferred device is a cushion which is designed as a weight bearing device.

The invention also concerns methods for treating laminitis in a horse comprising fitting said horse with a device described herein. In some embodiments, the device is a shoe, boot, or other cushioning device.

In yet another embodiments, the invention concerns methods for increasing comfort of a shoe designed for humans, said shoe comprising a device described herein. Some devices include shoe components such as inserts.

Other embodiments of the invention concern methods of manufacturing a shoe comprising including a cushioning composition described herein in the construction of the inner or outer sole of said shoe.

The invention also concerns boots or shoes. Some boots or shoes are adapted for use on a horse. Some boots or shoes comprise (i) a base portion; (ii) a wall portion formed on the base portion and extending upward which, together with said base portion, provides an opening to accommodate the hoof of said horse; (iii) a cushioning composition of anyone of claims 1-8 which is placed within said opening and contacting said base portion; and (iv) a means for securing said boot or shoe to said horse. In some embodiments, the boot or shoe is constructed such that it has at least two portions including a front portion and a back portion, relative to the position of the horse's hoof, such that said front portion has a Shore A hardness that is less than said rear portion.

The invention also concerns clothing that comprises a composition of the instant invention. In some embodiments, the composition is utilized in a portion of clothing that can benefit from a cushioning composition.

In yet another embodiment, the invention encompasses protective coverings such as leg coverings. Such coverings include shin guards, knee pads and the like. Constructions of these coverings comprise a compound of the instant invention.

DETAILED DESCRIPTION OF ILLUSTRATIVE EMBODIMENTS

Figure 1:
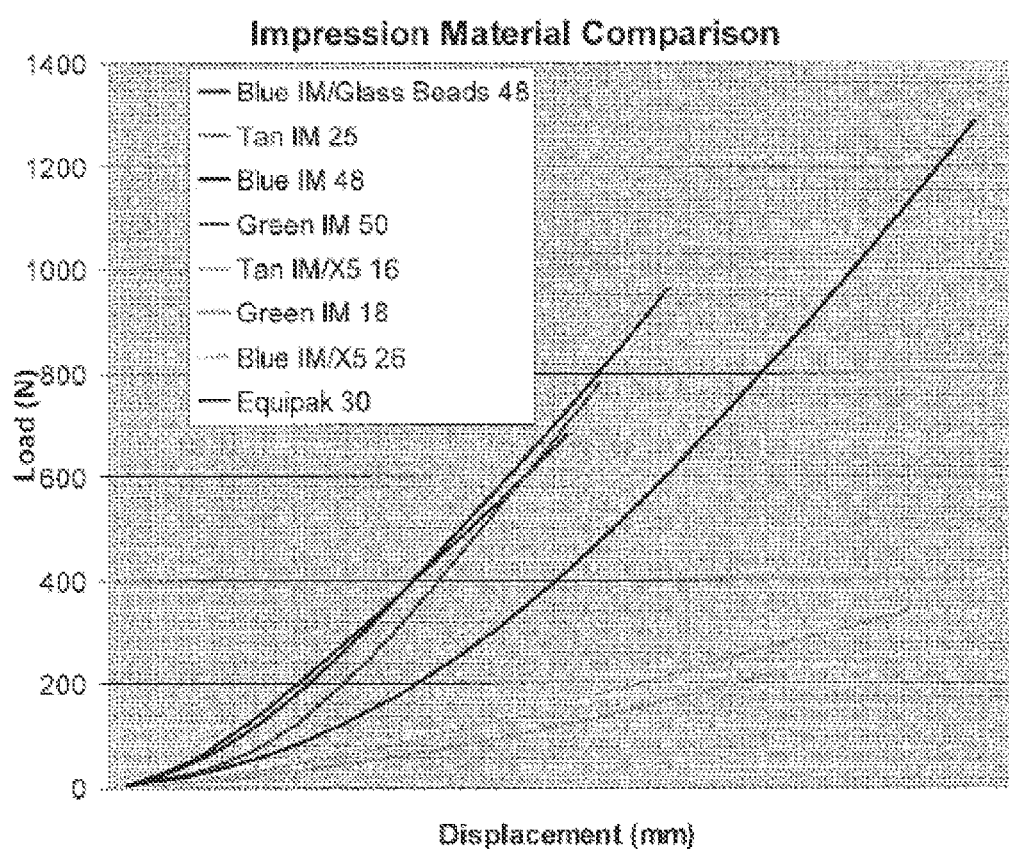
FIG. 1 shows measurements of the ability of various silicone polymers to resist displacement of a given amount of force with consideration of the A-shore scale measure of hardness. This response is relatively linear at the level of force consistent with equine athletic performance.

The present invention may be understood more readily by reference to the following detailed description taken in connection with the accompanying figures and examples, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

As used in the specification including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

As employed above and throughout the disclosure, the terms, unless otherwise indicated, shall be understood to have their normally used meanings.

The devices of the present invention provide a padding, cushioning or shock absorption. In some embodiments, the device is a boot or shoe for a horse or other animal, a shoe (athletic shoes, in some embodiments) for humans, a pad or a cushion. When used in a shoe or boot, the devices are sometimes referred to as a "gel" or "gel pad" or "orthotic".

Some devices use a silicone or urethane based material as the primary material. In some embodiments the silicone or urethane material may contain an open pore structure. In other embodiments, a non-porous material may be utilized.

Two part silicone putty, for instance, has several uses in varying industries, including the fabrication of equine orthotics. Softer materials have several advantages relating to the comfort of the patient, however harder materials provide a greater level of support for the equine hoof A material categorized a "soft" capable of providing the support of "hard" materials would have benefits in numerous industries, including equine orthotics.

The use of silicone based polymeric putty has shown to be one of the most popular methods for sole support for the laminitic horse. These materials are also used in the dental industry for their ability to create molds and are commonly referred to as dental impression material, and in other industries requiring room temperature molds. The firmness of the final product is usually measured on the A-Shore scale, varying from 25 (the approximate hardness of a rubber band) to 75 (the hardness of a tire tread). Under loads, these silicone polymers tend to absorb force in a linear fashion.

It is desirable that the silicone (or other polymer such as polyurethane) provide resistance to force that is non-linear in nature. In this regard, soft materials provide little support while more firm materials provide more support. The incorporation of a silicone additive such as Dow Coming Chemical X5-8017, formerly No. 6360 B1 (more simply X-5 hereinafter), X5-8023 and XS-8800 (marketed by the Dow Coming Corporation of Midland, Mich.) in the prepolymer state changes the ability of the base material to withstand force without displacement at higher loads and in a non-linear manner. When X-5 or similar silicone rubber is used as a pressurizing polymer for transitioning from solid to liquid under pressure, the polymer is referred to as "Hydraulic Silicone Crumb." See, for example U.S. Pat. No. 4,686,271.

Incorporating X-5 into the silicone polymeric putty shows an initial effect of lowering the measured hardness on the A-Shore scale. The amount of change is dependent upon several factors, including the base material composition and the concentration of the mixture. The X-5 additive changed the measured hardness of each of five commercial silicone putty examined Such incorporation provides analogous results for urethane polymers.

The amount of hydraulic silicone crumb incorporated into the silicone or polyurethane polymer is less than 50% by weight. In some preferred embodiments, the amount of hydraulic silicone crumb is much lower. One skilled in the art can readily tailor the amount of hydraulic silicone crumb to provide a composition with the desired product for use for a particular function.

A more detailed examination of the X-5 additive was conducted using a material testing device (Instron®). As shown in FIG. 1, the base silicone by itself responded to vertical force in a semi-linear manner. Softer materials were less supportive than harder materials. FIG. 1 shows measurements of the ability of various silicone polymers to resist displacement of a given amount of force with consideration of the A-shore scale measure of hardness. This response is relatively linear at the level of force consistent with equine athletic performance.

Figure 2:
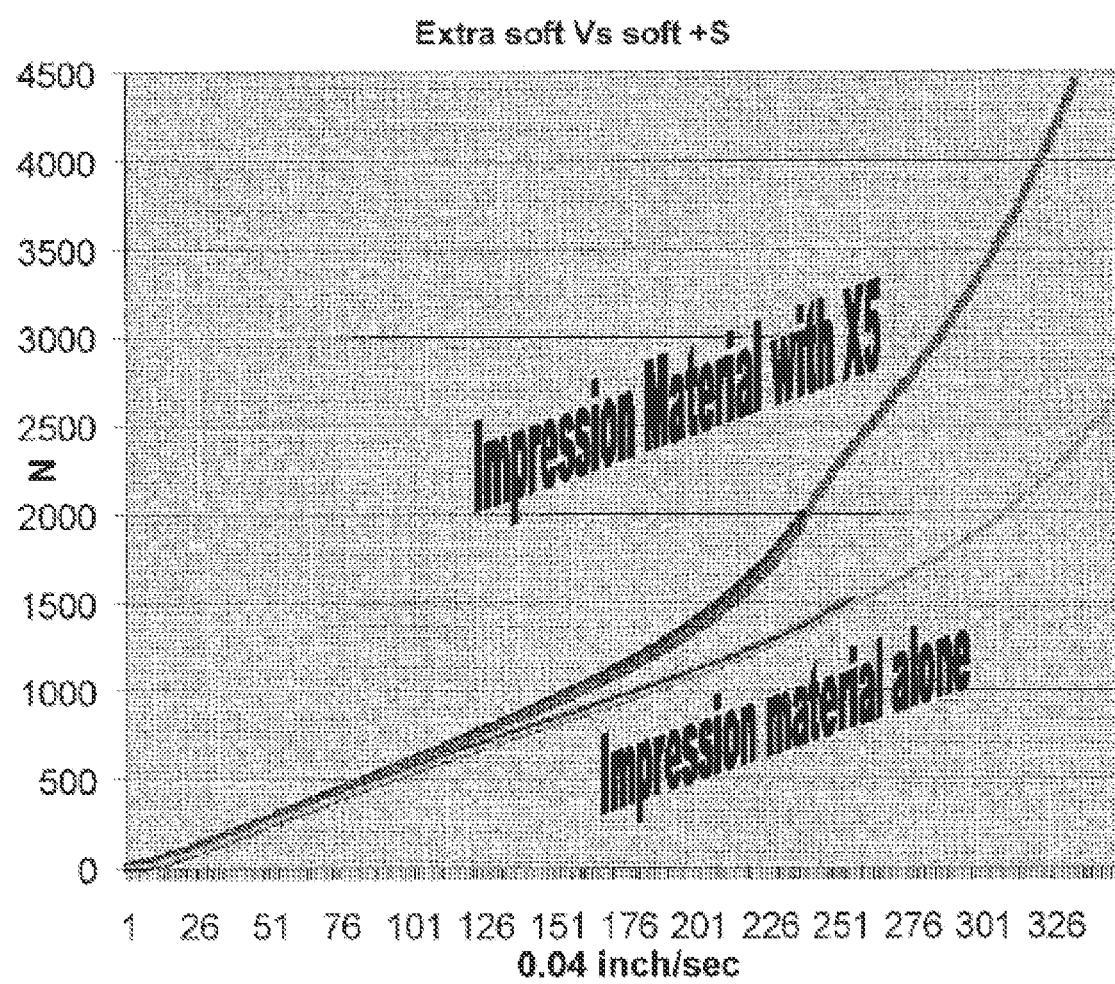
FIG. 2 shows a comparison of samples with equal starting hardness as measured on the A-Shore scale (25). The sample consisting of Impression Material (silicone putty) with the X-5 resisted deformation more effectively than the base material with no additive.

Silicone putty with incorporated X-5 was then compared to a silicone putty of equal hardness without the additive. The samples responded in a similar manner to vertical forces less than 1000 N (FIG. 2). At forces exceeding 1000 N, the samples responded in an inconsistent manner, with the X-5 added samples resisting deformation more effectively than the control samples. FIG. 2 shows a comparison of samples with equal starting hardness as measured on the A-Shore scale (25). The sample consisting of Impression Material (silicone putty) with the X-5 resisted deformation more effectively than the base material with no additive.

Urethanes are also commonly also utilized in the fabrication on equine orthotics. The incorporation of hydraulic crumb silicone to commercially available polyurethanes for this intended use demonstrated a similar effect upon the A-shore scale hardness to the changes observed when incorporating the X-5 into elastomeric silicone materials. The original hardness of the urethane orthotic was measured at 60 on the A-shore scale (one hour after catalyzing the urethane). Addition of the hydraulic silicone reduced this value to 40-45 depending on the concentration over the same period of time. Numerous other end uses have been found for urethane polymers.

The product of the invention is advantageous over existing products in the equine orthotic market, as softer materials are associated with comfort. The ability to provide comfort without sacrificing support is a distinct advantage in both therapeutic and performance footwear for the horse. This same also applies to other industries—ranging from human orthotics to car seats or mattresses. This would possibly have an advantage in any industry where comfort and support would appear to be a conflict of mechanical values.

In some embodiments, hydraulic crumb silicone can be made by the methods disclosed in U.S. Pat. No. 4,686,271, the disclosure of which is incorporated herein by reference. Some preferred materials include dimethylsilicones that have vinyl groups. In some embodiments, they may be produced by conventional commercial procedures, including production from polysiloxanes using various vulcanizing techniques. Preferred materials include X5-8017, formerly No. 6360 B1 (more simply X-5 hereinafter), X5-8023 and X5-8800 by the Dow Corning Corporation (Midland, Mich.).

Hydraulic crumb silicone, such as X5 silicone rubber, is characterized by low strength and high friability. By "high friability" is meant there is such low strength that moderate size solids tend to disintegrate into smaller particulates when subjected to modest mechanical forces, even rubbing between the fingers. The X5 material has a Shore A hardness of less than 1 (Shore 00 hardness of 50-55) and compressive strength of the order of 70 kPa when measured on a 2.5 cm square by 1.27 cm thick specimen, and upon a compression deformation of about 40%, it shears into smaller particles. This behavior is contrasted with that of more conventional rubbers which have higher strength, greater resistance to deformation and greater elongation to failure. It has also been observed that preferred polymer useful with the present invention has a tendency to disintegrate into smaller particulate. By example, it is found that over time, a nominal 30 mesh size powder having about 50 weight percent retained on a 40 mesh screen will change to one having only about 25 weight percent retained on 40 mesh.

Any suitable silicone polymeric putty may be used in the invention. As used herein, the term "silicone polymeric putty" means a pliable silicone polymeric material. Silicon putty is sometimes referred to as silicon gels, silicon rubber or silicone elastomer in the art. The silicone polymer may, for example, include polyalkylsiloxanes, such as silicone polymers formed of a precursor, such as dimethylsiloxane, diethylsiloxane, dipropylsiloxane, methylethylsiloxane, methylpropylsiloxane, or combinations thereof. Certain polyalkylsiloxanes include polydialkylsiloxane, such as polydimethylsiloxane (PDMS). Another polyalkylsiloxane is a silicone hydride-containing polydimethylsiloxane. Still other polyalkylsiloxanes are vinyl-containing polydimethylsiloxanes. Yet other silicone polymers are a combination of a hydride-containing polydimethylsiloxane and a vinyl-containing polydimethylsiloxane. In an example, the silicone polymer is non-polar and is free of halide functional groups, such as chlorine and fluorine, and of phenyl functional groups. Alternatively, the silicone polymer may include halide functional groups or phenyl functional groups. For example, the silicone polymer may include fluorosilicone or phenylsilicone. In some embodiments, the silicone putty is a cross-linked composition. When the silicone elastomer is a cross-linkable elastomer, compositions such as those described in U.S. Pat. Nos. 6,569,958, 6,569,955, 6,465,552, 6,417,293, 6,362,288, and 6,362,287 may be utilized.

Any suitable polyurethane polymer may be used with this invention. Polyurethanes are well known in the art. Some polyurethanes are polyester-based polyurethanes or polyether-based urethanes. Examples of polyurethane polymers include thermoplastic polyurethanes (TPUs). Some polyurethanes are thermoset polyurethane foams. In some preferred embodiments, the polyurethane is a thermoplastic polyurethane having a Shore A hardness of about fifty-five 55-75 or 65-70. Selecting a suitable polyurethane is within the ability of those skilled in the art.

Polyurethanes can be made by methods well known to those skilled in the art. Such methods include reacting a polyisocyante (a diisocyante in some embodiments) with one or more polyether diols and/or polyester diols. Suitable polyether polyols include polypropylene glycols P2000 and P3000 marketed by Dow Chemical Company and TERATHANE® polytetramethylene ether glycols (1000-3000 molecular weight in some embodiments) marketed by Invista. Polyester polyols include TERATE® polyols (aromatic polyester polyols) marketed by Invista.

Isocyanates suitable for use in the invention include aromatic diisocyanates. Examples of suitable isocyanates are disclosed U.S. Pat. Nos. 4,376,438, 4,433,680, and 4,502,479. These isocyanates include 2,4'-diphenylmethane diisocyanate, 4,4'-diphenylmethane diisocyanate, and mixtures thereof. Some compositions also include minor amounts (less than 5%) of 2,2'-diphenylmethane diisocyanate and other aromatic polyisocyanates. Certain commercial isocyanates are marketed by Dow Chemical Company as ISONATE* MDI isocyanates.

In some embodiments, polyurethanes can be produced by reacting the isocyanate component with the polyether and/or polyester polyol at a suitable ratio of NCO groups to OH groups to form a prepolymer composition. In some embodiments, the NCO:OH ratio of the components of the prepolymer resin is preferably within the range of about 1.5:1 to about 8:1, about 2.5:1 to about 4:1 in some embodiments. The prepolymer can be reacted with water (atmospheric in certain embodiments) or other suitable compound with active hydrogen groups to form the final polymer.

In some embodiments the device is a pad that is used to cushion or protect the bottom portion of a horse's hoof. The coverage can include one or both of the ground-contacting portion of the hoof wall (or at least the side wall portions of the hoof wall—in some laminitis cases the toe of the hoof wall is trimmed away so that it is no longer weight bearing) and the sole, and may also cover the frog. Such coverage can be especially important in treating laminitic horses, where the coffin bone has rotated downward and is pushing the sole distally (into the ground). The sole pad may be applied alone (taped or glued in place), or can be placed under a horseshoe which is nailed or glued in place. Alternatively, the sole pad can be incorporated into the bottom of a "boot" that extends up along the lateral sides of the hoof wall, and laced, strapped or buckled into place.

The pads designed for use with a horse may be preformed and used as described above. In other embodiments, the compositions described herein can be placed in the bottom of the horse hoof (which preferably has been cleaned and prepared) and allowed to set. This can then be secured by any conventional means including those described herein for pads and shoes.

The devices described herein can also be used in the soles or inserts placed within a human shoe to provide support and/or comfort to the wearer. The soles and inserts can be manufactured by conventional methods using conventional materials and adapted to accommodate a device described herein.

Cushions and padding may also include the devices described herein. The cushions may include furniture, seats (including those in vehicles such as cars, buses, trains, airplanes and the like). These cushions or padding may be made by conventional manufacturing techniques adapted to include a device of the invention.

Shore 00 hardness, A-shore hardness and compressive strength can be measured by techniques well known to those skilled in the art. For example, Shore 00 hardness and A-shore hardness can be measured using ASTM D2240-00. Compression strength can be determined using an Instron® testing instrument and techniques described in The ASM Handbook®, Volume 8, Mechanical Testing and Evaluation.

The compositions of the invention can also be utilized in the construction of clothing items, shin guards and the like. In such uses, the composition may be utilized in a portion of clothing that can benefit from a cushioning composition. Use areas include, but are not limited to areas of clothing adjacent to or covering the knee, elbow and any other area of the body that may benefit from protection from impact or stress.

In the case of protective coverings, such as protective leg coverings (including shin guards and knee pads), a composition of the instant invention is placed so as to assist in the absorbing the impact. In some embodiments the protective covering may comprise a rigid material and a compound of the instant invention which may optionally be placed between the rigid structure and the body. Other layers and attachment means may be included.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention is illustrated by the following examples which are intended to be illustrative and not limiting.

EXAMPLES

Example 1

A human shoe is constructed comprising a cushioning compound described herein. The cushioning portion of the shoe may be built in or may be an insert.

Example 2

A boot or shoe designed to be fitted to a horse is constructed comprising a cushioning compound described herein.

Example 3

An article of clothing is constructed comprising a cushioning compound described herein. The cushioning portion of the clothing may comprise the entire article of clothing or a portion of the clothing designed to address a cushioning need.

Example 4

A cushion which is designed as a weight bearing device is constructed using a cushioning compound described herein.

Example 5

A shin guard is constructed comprising a cushioning compound described herein.

Example 6

A knee pad is constructed comprising a cushioning compound described herein.

What is claimed:
1. A cushioning composition comprising:
 (a) at least one of urethane polymer and silicone polymeric putty; and
 (b) hydraulic silicone crumb; said hydraulic silicone crumb being mixed with component (a).
2. The cushioning composition of claim 1 wherein said hydraulic silicone crumb has a Shore 00 hardness of 50-55.
3. The cushioning composition of claim 1, wherein said hydraulic silicone crumb has a compressive strength of 60-80 kPa when measured on a specimen that is 2.5 cm square and 1.27 cm thick.
4. The cushioning composition of claim 3, wherein said hydraulic silicone crumb has a compressive strength of about 70 kPa when measured on a specimen that is 2.5 cm square and 1.27 cm thick.
5. The cushioning composition of claim 1, wherein said hydraulic silicone crumb, upon a compression deformation of about 40%, shears into smaller particles.
6. The cushioning composition of claim 1, wherein said silicone polymeric putty comprises vinyl terminated polydimethylsiloxane, hydroxy terminated polydimethyl siloxane, and polydimethyl siloxane.
7. The cushioning composition of claim 1, wherein said polyurethane polymer is derived from reactants comprising aromatic diisocyanate and at least one of polyether polyol and polyester polyol.
8. The cushioning composition of claim 1, wherein said hydraulic silicone crumb expresses a non-linear deformation response to pressure at pressures exceeding 1000 N.
9. A device comprising a cushioning composition of claim 1.
10. The device of claim 9, wherein the device is adapted for use as a component of an orthotic sole pad, shoe, or boot for a horse.
11. The device of claim 9, wherein the device is adapted for use as a component of a human shoe.
12. The device of claim 11, wherein said human shoe is an athletic shoe.
13. The device of claim 11, wherein said device is an insert for said shoe.
14. The device of claim 9, wherein the device is a shin guard or knee pad.
15. The device of claim 9, wherein the device is adapted for use as cushion which is designed as a weight bearing device.
16. A method for treating laminitis in a horse comprising fitting said horse with a device of claim 10.
17. A method of increasing comfort of a shoe designed for humans, said shoe comprising a device of claim 11.
18. A method of manufacturing a shoe comprising including a cushioning composition of claim 1 in the construction of the inner or outer sole of said shoe.
19. A boot or shoe adapted for use on a horse, said boot comprising:

a base portion;

a wall portion formed on the base portion and extending upward which, together with said base portion, provides an opening to accommodate the hoof of said horse;

a cushioning composition of claim 1 which is placed within said opening and contacting said base portion; and a means for securing said boot or shoe to said horse.

20. The boot or shoe of claim 19, wherein said device is constructed such that it has at least two portions including a front portion and a back portion, relative to the position of the horse's hoof, such that said front portion has a Shore A hardness that is less than said rear portion.

21. An article of clothing comprising a composition of claim 1.

* * * * *